(12) United States Patent
Nguyen-Nhu

(10) Patent No.: US 6,757,021 B1
(45) Date of Patent: Jun. 29, 2004

(54) METHOD FOR CONTROLLING A VIDEO REFLECTION DEVICE CONTAINING A CCD IMAGE CONVERTER AND A VIDEO ELECTRONICS UNIT, FOR A MOTION PICTURE CAMERA

(75) Inventor: Anh Nguyen-Nhu, Unterschleissheim (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 0 days.

(21) Appl. No.: 09/423,177
(22) PCT Filed: May 4, 1998
(86) PCT No.: PCT/DE98/01286
§ 371 (c)(1),
(2), (4) Date: Nov. 2, 1999
(87) PCT Pub. No.: WO98/51075
PCT Pub. Date: Nov. 12, 1998

(30) Foreign Application Priority Data

May 2, 1997 (DE) .......................................... 197 20 148

(51) Int. Cl.$^7$ .......................... H04N 5/235; H04N 5/238
(52) U.S. Cl. ....................................... 348/362; 348/363
(58) Field of Search ................................ 348/362, 363, 348/368, 64, 220.1, 221.1, 364, 224.1; 396/429, 505

(56) References Cited

U.S. PATENT DOCUMENTS

| 3,114,002 | A | * | 12/1963 | Siepmann et al. .......... 348/368 |
| 4,504,866 | A | | 3/1985 | Saito |
| 4,532,550 | A | * | 7/1985 | Bendell et al. ............. 348/368 |
| 4,571,629 | A | * | 2/1986 | Horio et al. ............. 348/221.1 |
| 4,734,777 | A | * | 3/1988 | Okino et al. ............. 348/221.1 |
| 4,928,171 | A | * | 5/1990 | Kline .......................... 348/64 |
| 5,137,346 | A | | 8/1992 | Sattler et al. |
| 5,218,441 | A | | 6/1993 | Karcher |

FOREIGN PATENT DOCUMENTS

| DE | 38 33 823 C1 | 2/1990 |
| DE | 39 02 688 C2 | 8/1990 |
| DE | 42 11 427 A1 | 10/1993 |
| EP | 0 377 914 A1 | 7/1990 |
| EP | 0 712 236 A1 | 5/1996 |
| JP | 07-143439 | * 6/1995 |
| WO | WO 90/08975 | 8/1990 |

OTHER PUBLICATIONS

H.D. Jacoby et al., "Electronics in the New Generation of Arriflex Cameras" 8012 SMPTE Journal 100 (1991) No. 11, U.S., pp. 880–883.

* cited by examiner

*Primary Examiner*—Aung Moe
(74) *Attorney, Agent, or Firm*—Christie, Parker & Hale, LLP

(57) ABSTRACT

A motion picture camera for transporting and exposing a motion picture film with an adjustable rotary shutter, a rotation surface (dark sector) of which reflects the recording path of rays to at least a video recording device that has a CCD image sensor and a video electronic mechanism, and an opening sector (bright sector) of which releases rays to a recording path for film exposure, and with a sensor for determining the shutter aperture angle of the adjustable rotary shutter. A shutter logic controls the light quantity falling onto the CCD image sensor and/or the charging of the CCD image sensor dependent upon the shutter aperture angle.

9 Claims, 3 Drawing Sheets

METHOD FOR CONTROLLING A VIDEO REFLECTION DEVICE CONTAINING A CCD IMAGE CONVERTER AND A VIDEO ELECTRONICS UNIT, FOR A MOTION PICTURE CAMERA

FIELD OF THE INVENTION

The invention relates to a method for controlling a video reflection device for a motion picture camera containing a CCD image sensor and a video electronic mechanism, and to a device for implementing the method.

BACKGROUND OF THE INVENTION

In order to expose a motion picture film in a motion picture camera, unexposed film is unwound from a film cassette and intermittently moved past a film gate, where the unexposed film goes into the path of rays through a recording lens. During the exposure of the motion picture film, rays are released into the film path, while for the duration of film transportation from one film image to be exposed to the next, the path of rays is covered by means of a shutter. When the next film image has reached the prescribed position in front of the film gate, the rays are again released into the film path for the purpose of exposing the film image in question.

In motion picture cameras with an adjustable rotary shutter, the release and covering of rays in a film path with intermittent film transportation takes place through a rotary shutter that is mechanically or electrically coupled to the film transport mechanism. The rotary shutter has a semi-circular-shaped reflection surface (dark sector) and an opening sector (bright secto). During film transportation, the reflection surface covers the film gate and leads rays from the film path—because the reflection surface is facing the object—through one or several ray dividers into an ocular, a video reflection device, and the like. During film transportation, the object can thus be observed through the ocular, recorded through the video reflection device and transmitted to a monitor. When the motion picture film is stationary in front of the film gate, the opening sector, or bright sector of the rotary shutter, releases rays into the recording path for the purpose of exposing the respective film image.

For the purpose of changing the exposure time of the motion picture film when there is a prescribed or variable film transport speed, the adjustable rotary shutter is formed from two coaxial circular sectors which can be adjusted against one another in such a way that the shutter aperture angle is variable. WO 90/08975 for example, disclosed an adjustable rotary shutter for a motion picture camera that consists of a rotary shutter and a shutter adjusting blade that can be adjusted coaxially thereto. The shutter adjusting blade is connected by a drive mechanism to an adjustment motor coupled to the rotary shutter shaft. The rotary shutter shaft is driven by either the main motor of the motion picture camera for the film transport mechanism or by its own drive motor that is electronically coupled to the main motor of the motion picture camera and/or synchronized with the number of revolutions thereof.

Between the shutter adjusting blade and the rotary shutter or the rotary shutter shaft there is a first recording device in the form of an analog or digital angle indicator, that emits a signal corresponding to the position of the shutter adjusting blade in relation to one or more of the rotary shutter and rotary shutter shaft. A second recording device in the form of a light barrier positioned in the region of the rotary shutter measures the opening time of the rotary shutter during operation.

The changing of the shutter aperture angle can be carried out either manually or automatically, or programmed so that the shutter aperture is adapted to respective light ratios, to achieve specific effects or so that the shutter aperture and thus the exposure time of the motion picture film is adapted to the respective film speed.

By adjusting the shutter aperture angle of the adjustable rotary shutter, the amount of light falling onto the motion picture film is varied. However, the reflection surface of the adjustable rotary shutter that refracts rays from the film path into the viewfinder ocular and a video reflection device during film transportation generally has a constant sector angle of 180°. Therefore, a constant light quantity goes into the viewfinder ocular and to the video reflection device. On the other hand, if there is a change in the shutter aperture angle, for example by 4 shutter stages from 11.75 to 180°, a variable light quantity reaches the film.

In the case of an unchanged reflection surface of 180° sector angle and constant rotation speed of the rotary shutter, in relation to the video reflection device, the video image becomes too light or too dark depending upon the prevailing light ratios. With an adjustment field of the adjustable rotary shutter from an opening angle of 11.75° to an opening angle of 180°, the light quantity reaching the video reflection device changes by 4 shutter stages.

An adaptation of the video image to the respective light ratios may be produced through automatic gain control (AGC). Such automatic adaptation to the respective light ratios is, however, undesirable if the lightness on the video image is to correspond to the lightness on the film, to create equal ratios.

DE 42 11 427 A1 disclosed a method for reducing the lightness shimmer of video images of a video camera directed at the path of rays of a motion picture camera with an adjustable rotary shutter. The number of revolutions and position of the adjustable rotary shutter are registered by a sensor and emitted as a shutter pulse signal, whereby the video camera has a CCD image sensor, an image storage device and a video signal output. With this existing method, the phase displacement between the shutter pulse signal and a video synchronizing signal is recorded. The amplitude of the video signal emitted from the video camera to the image storage device is controlled depending upon the size of the phase displacement between the shutter pulse signal and the video synchronizing signal, and is used as a control signal for the voltage-controlled intensifier of the video camera.

The existing method can be used to solve the problem that occurs when using video cameras with high light sensitivity in video reflection devices of a motion picture camera. The charge of the CCD image sensor is erased with each semi-image selection, resulting in a strong lightness shimmer with a viewfinder image reflection on a motion picture camera. The rotation speed is recorded and the phase position of the adjustable rotary shutter is emitted as a shutter pulse to a control and regulating device. The control and regulating device contains an image storage device, a programmable binary counter, an octal flip-flop and a digital-analog converter. The connection between the shutter pulse and the control pulses of the CCD image sensor of the video reflection device serves to influence the control voltage of the voltage-controlled intensifier of the video reflection device so that amplitude variations that occur with differing motion picture speeds and video frequencies are reduced to a minimum.

The existing control method does not address the problem that occurs when using a video reflection device with a CCD image sensor in a motion picture camera, into which a highly sensitive or less sensitive motion picture film can be loaded, wherein the video signal emitted by the video reflection device is over-modulated or has an amplitude which is too low.

A further problem is that in the case of a change in the shutter aperture angle of the adjustable rotary shutter of the motion picture camera, the light quantity falling onto the motion picture film in the light phase of the shutter sector is inversely proportional to the light quantity falling onto the CCD image sensor in the dark phase of the shutter sector. Exposure differences of up to 4 shutter stages can thereby arise.

Both problems lead independently of one another to a situation whereby the lightness of the film images can deviate considerably from the lightness of the video images. Therefore, the visual impact of a film recording sequence that is reproduced on a video image can deviate considerably from the visual impact that the sequence imparts on the motion picture film.

SUMMARY OF THE INVENTION

It is an object of the present invention to create a method for controlling a video reflection device containing a CCD image sensor and a video electronic mechanism, that ensures adaptation of the video image to differing light ratios and/or shutter aperture angles of the adjustable rotary shutter.

The solution according to the invention ensures that in the case of differing light ratios and/or differing shutter aperture angles of the adjustable rotary shutter, a prescribed light quantity corresponding to the film exposure is processed by the video reflection device. In the case of a constant reflection surface of for example 180° with a change in the shutter aperture angle for the purpose of changing the exposure time of the motion picture film, the video image can be varied by at least 4 shutter stages and thus be adapted to the exposure of the film image.

Preferably, a shutter logic fixes the time and duration of the charging of the CCD image sensor depending upon the shutter aperture angle in such a way that the exposure time of the CCD image sensor and thus the light quantity taken up is proportional to the film exposure time. This control makes it possible to adapt the exposure ratios of the video reflection device to changes in the film exposure very quickly and with limited technical switching.

In a preferred embodiment of the present invention, the shutter logic controls the substratum voltage of the CCD image sensor so that the CCD image sensor is constantly discharged during the fading-out of rays in the film exposure path.

In an alternate embodiment, the shutter logic controls the substratum voltage of the CCD image sensor so that the CCD image sensor is discharged before it is charged dependent upon the exposure time of the CCD image sensor that is determined by the shutter logic.

With this control of the shutter logic, a change in the film exposure recorded immediately beforehand in the film exposure phase is converted, and equal ratios created, between the charging of the CCD image sensor and the film exposure.

Preferably, the shutter logic connects the video timing frequency to one or more of the shutter aperture angle determined by a first sensor and the position of the adjustable rotary shutter determined by a second sensor.

The shutter logic facilitates control of the charging of the CCD image sensor dependent upon the adjusted or prescribed film exposure of the motion picture camera both in standstill or out of standstill and during the operation of the film transport mechanism.

A device for implementing the above-described method comprises a microprocessor that on the input side is struck with a video timing signal emitted by the video electronic mechanism and with the output of at least one of a sensor recording the shutter aperture angle and a sensor recording the position of the adjustable rotary shutter. The microprocessor is connected on the output side to a timing generator. The timing generator, which is also struck with the video timing signal, controls the CCD image sensor on the output side and emits output signals to a shutter logic. The shutter logic connects these signals and emits a control signal with which the respective stored charge of the CCD image sensor is once again discharged if the shutter aperture angle of the adjustable rotary shutter deviates from a prescribed value. The shutter logic emits the control signal to a component that is subsequently switched and that influences the substratum voltage of the CCD image sensor, whereby the component times the substratum voltage for the purpose of discharging the CCD image sensor.

By reference to an embodiment of the invention illustrated in the drawings, the thought behind the invention will now be examined in greater detail.

DETAILED DESCRIPTION OF THE INVENTION

Figure 1:
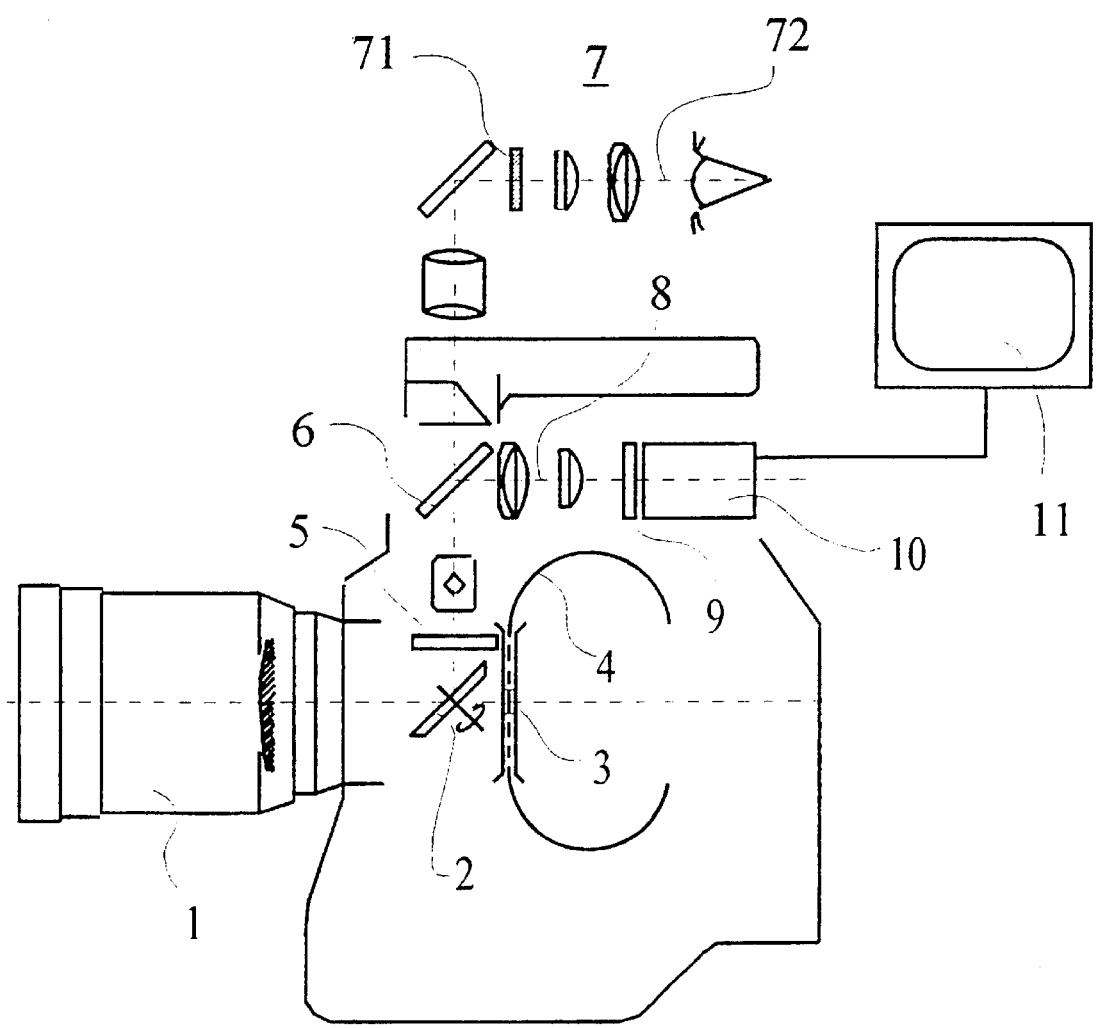
FIG. 1 is a schematic representation of a path of rays in a motion picture camera with a rotary shutter and a video reflection device.

FIG. 1 shows a schematic representation of an optical system of a motion picture camera with video reflection. The optical system has a recording lens 1, through which rays in a recording path enter the motion picture camera and encounter an adjustable rotary shutter 2. According to FIG. 2, the adjustable rotary shutter 2 comprises a semi-circular-shaped reflection surface 21 with a periphery angle of generally 180° and a shutter adjusting blade 22 positioned coaxially to the reflection surface 21. The shutter adjusting blade 22 is adjustable in relation to the reflection surface 21 in such a way that, theoretically, shutter aperture angles from 0 to 180° of the adjustable rotary shutter 2 can be achieved.

Depending upon the angle position of the adjustable rotary shutter 2, the rays in the recording path encounter an opening sector (bright sector) and pass through the opening sector in a film-exposing path through a film gate 3 to a motion picture film 4 in a film channel. During transportation of the motion picture film 4, the film gate 3 is covered by the reflection surface 21 of the adjustable rotary shutter 2, and rays in the recording path are refracted onto a focusing screen or fibre plate 5. From the focusing screen or fiber plate, the path of rays with parallel displacement goes through a turning device onto a ray divider 6, which splits the rays refracted from the adjustable rotary shutter 2 into rays in a viewfinder path and rays in a video path.

The rays in the viewfinder path go through a plane disc 71 and an ocular 72 of a viewfinder lens 7. The ocular 72 facilitates the observation of the viewfinder image that is formed as an aerial view between the plane disc 71 and the ocular 72.

The rays in the video path go through a video lens 8 onto a CCD image sensor 9, that is connected to a video electronic mechanism 10. A video signal emitted by the video electronic mechanism 10 is generally transmitted and/or processed further. For example the video signal is passed to a monitor 11, on which a video image of the object is represented, or to a video recording device that stores video recordings.

FIGS. 3a, 4a and 5a clarify, in a schematic transitory representation, the light quantities reaching the motion picture film and the CCD image sensor of the video reflection device with differing shutter aperture angles.

Figure 3:
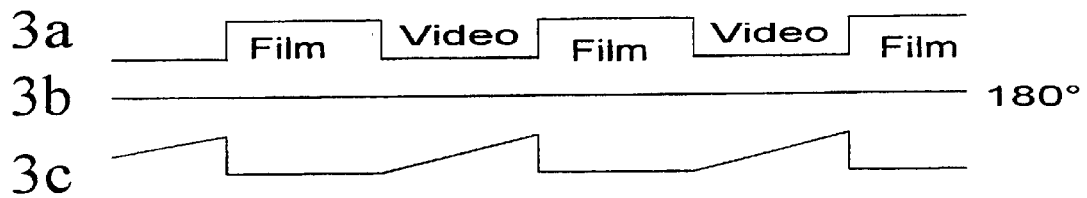
FIG. 3 is a schematic transitory representation of a film exposure and control signals of the CCD image sensor with a shutter aperture angle of 180°.

With a shutter aperture angle of 180°, the shutter adjusting blade 22 is positioned congruently to the 180°-reflection surface 21 of the adjustable rotary shutter 2. As shown in FIG. 3, equal light quantities reach both the motion picture film and the CCD image sensor.

FIG. 4a shows that with a shutter aperture angle of 90°, as a result of the 180°-reflection surface 21 of the adjustable rotary shutter 2, an unchanged light quantity would fall onto the CCD image sensor, whereas the light quantity reaching the motion picture film is halved (the hatched area indicates the fading-out of rays in the film exposure path through the shutter adjusting blade in relation to its complete opening) in such a way that the ratio between the film light quantity and the video light quantity would be 1:2.

With further closing of the shutter adjusting blade to a shutter aperture angle of 45° as shown in FIG. 5a, there remains an unchanged light quantity falling onto the CCD image sensor. However, a quarter of the light quantity falling onto the CCD image would be directed onto the motion picture film so that the light quantity ratio between film exposure and exposure of the CCD image sensor would be 1:4.

The ratios shown in FIGS. 3a, 4a, and 5a make clear that with a constant rotation speed of the adjustable rotary shutter, and with an adjustment field of the adjustable rotary shutter of for example 10°–180°, the light quantity reaching the CCD image sensor is increased by 4 shutter stages if the shutter aperture angle is correspondingly reduced from 180° to for example 10°.

Figure 2:
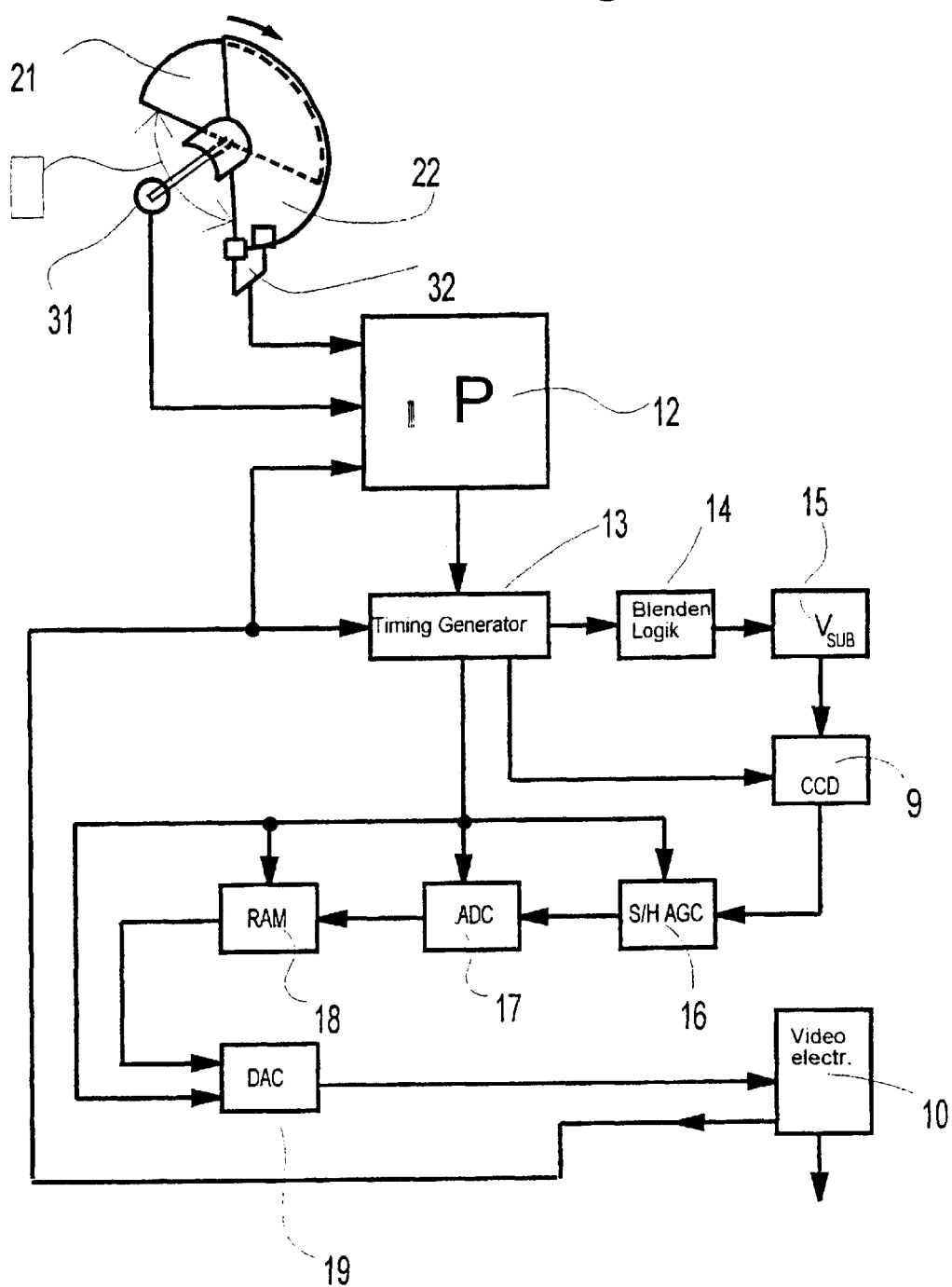
FIG. 2 is a block wiring diagram of a video image control.

FIG. 2 shows, in a schematic block wiring diagram, the switching configuration for achieving exposure control of the CCD image sensor dependent upon the shutter aperture angle.

The adjustable rotary shutter 2 consists, as described above, of a semi-circular-shaped reflection surface 21 and a shutter adjusting blade 22 which is positioned coaxially to the semi-circular-shaped reflection surface 21 and can be adjusted manually or by motor at a standstill or in operation in relation to the reflection surface 21. With a given rotation speed of the adjustable rotary shutter 2 and a given transportation speed of the motion picture film the shutter aperture angle determines the quantity of light falling onto the motion picture film for the purpose of exposing a film image.

According to WO 90/08975, the shutter aperture angle preferably is determined, both at a standstill and in operation, by means of a potentiometer connected to the rotary shutter shaft, an electro-optical, magnetic or similar sensor 31 and/or an analog or digital angle indicator 32. Sensors 31, 32 are used for determining both the shutter aperture angle and the position of the rotary shutter for fine correction.

The output signal of the sensor or sensors 31, 32 is fed to a microprocessor 12 together with a video timing signal emitted by a video electronic mechanism 10. The output of the microprocessor is connected to the input of a timing generator 13. At a further input of the timing generator 13 is the video timing signal. The timing generator 13 controls a shutter logic 14 as well as the CCD image sensor 9 and a selection switch of the CCD image sensor 9. The selection switch of the CCD image sensor consists of a scan-support-intensifier with automatic gain control (AGC) 16, an analog-digital converter 17, a storage component 18 and a digital-analog converter 19, whereby the output of the digital-analog converter 19 is connected to the video electronic mechanism 10. The video electronic mechanism 10 emits the video timing signal to both the microprocessor 12 and the timing generator 13 and emits the video signal to a recording device, a monitor, or other similar device.

The shutter logic 14 is connected on the output side to the CCD image sensor 9 via a component 15 which influences the substratum voltage $V_{SUB}$ of the CCD image sensor 9. On the output side, the CCD image sensor 9 is connected to an input of the scan-support-intensifier with automatic gain control 16.

The operation of the switching configuration illustrated in FIG. 2 will be explained below by reference to the transitory course of the control and exposure signals according to FIGS. 3 to 5.

The solution for aligning the video output signal with the size of the shutter aperture angle and thus with film exposure is based upon the physical properties of a CCD image sensor. The CCD image sensor consists of a multitude of matrix-form semi-conducting components as photo-electronic light receivers, that facilitate a break down of optical images from a camera lens into individual image elements and converts the optical images into electric signals. The matrix-form semi-conducting components are connected with electrical conduction to charge-coupled components that are connected to one another in lines (CCD elements). The charged coupled components temporarily store (charge image) the electrical signals coming from the matrix-form semi-conducting components before the electrical signals are retrieved through high frequency timing pulses and converted into video signals. The CCD image sensor function is based upon the displacement of electric charges within a CCD chain, through timing pulse voltages from outside on their control electrodes, and also upon a capacitative out-coupling of the resulting electric signals on a common signal output.

FIG. 3 shows, as explained above, the light quantity falling onto a film image and onto a CCD image sensor when there is a shutter aperture angle of 180°. Both the film image and the CCD image sensor receive the same light quantity in their respective exposure phase with a constant substratum voltage $V_{SUB}$, FIG. 3b. As shown in FIG. 3c, a storage charge forms in the CCD image sensor corresponding to the above-described operation of a CCD image sensor, whereby at the end of the exposure of the CCD image sensor a storage charge is selected, stored and passed to the video electronic mechanism during a later film exposure period.

Figure 4:
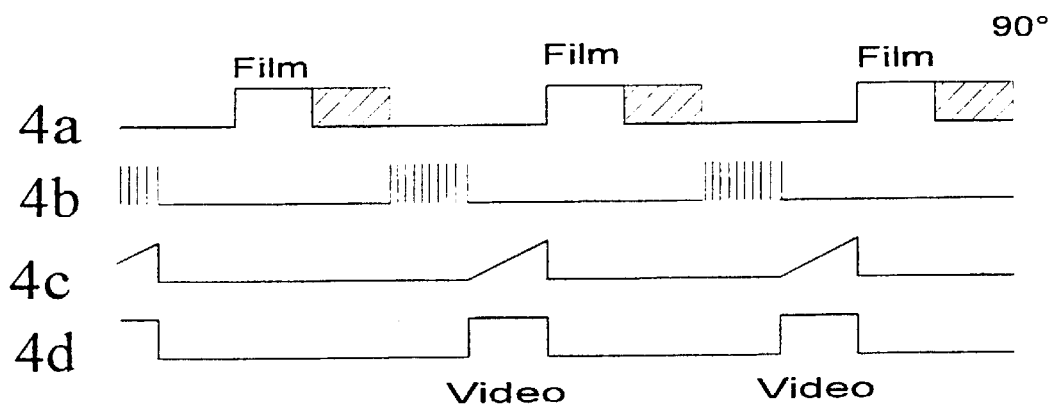
FIG. 4 is a schematic transitory representation of a film exposure and control signals of the CCD image sensor with a shutter aperture angle of 90°.

FIG. 4 shows exposure ratios of a film image and of the CCD image sensor when there is a shutter aperture angle of 90°. As seen in FIG. 4a, the light quantity falling onto a film image is only 50% of the light quantity falling onto a film image when there is a shutter aperture angle of 180°. The hatched area for film image exposure indicates the covering of the film gate by the shutter adjusting blade.

In order to adapt the exposure ratios of the CCD image sensor to the exposure ratios of the film image, the substratum voltage $V_{SUB}$ is timed and a pulse sequence is emitted to the CCD image sensor in such a way that the charge of the CCD image sensor stored in this time period is discharged again (FIG. 4b). The time period of the pulsed substratum voltage is controlled dependent upon the shutter aperture angle so that, according to FIG. 4c, the charge quantity stored in the CCD image sensor after the end of the timed substratum voltage corresponds to an exposure illustrated in FIG. 4d, which is equal to the exposure of the film image when there is an exposure opening angle of 45°.

Figure 5:
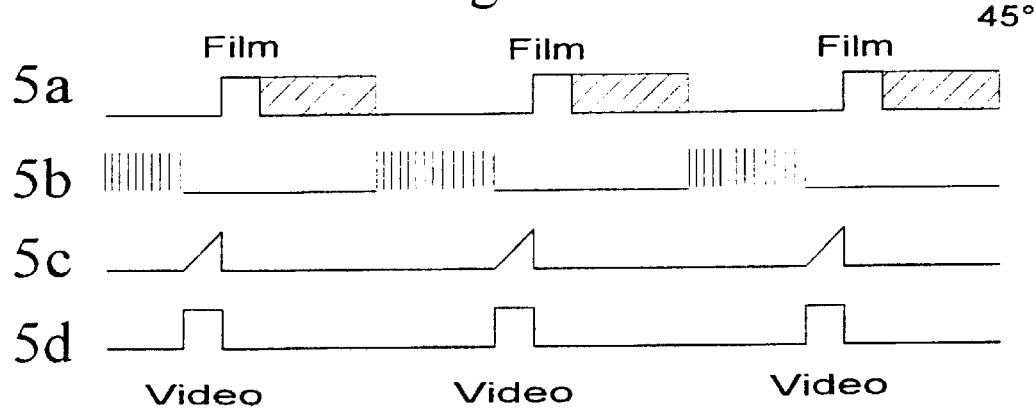
FIG. 5 is a schematic transitory representation of a film exposure and control signals of the CCD image sensor with a shutter aperture angle of 45°.

In order to clarify the operation of the configuration according to the invention, in FIG. 5 the corresponding signals are represented when there is a shutter aperture angle of 45°.

The light quantities and signals illustrated in FIGS. 3 to 5 make clear that the video signal is adapted to the film image exposure through constant discharging of the CCD image sensor in the fading-out time in such a way that the ratio of the exposure of the film image and the amplitude of the video signal is 1:1. Thus, independently of an automatic intensification of the video image, an adaptation of the video signal to the shutter aperture angle takes place.

The shutter control according to the invention can also be used in an analog way with CCD image sensors with progressive scan with correspondingly adapted shutter logic.

What is claimed is:

1. A method for controlling a video reflection device for a motion picture camera containing a CCD image sensor and an adjustable rotary shutter, the rotary shutter having a reflection surface (dark sector) and an opening sector (bright sector), the method comprising:

reflecting rays of a recording path at least to a video reflection device using the reflection surface of said rotary shutter;

releasing the rays into the recording path for film exposure using the opening sector of the rotary sector;

recording a shutter aperture angle of the rotary shutter by a sensor; and determining a preferred exposure time of the CCD image sensor based upon the recorded shutter aperture angle, controlling an exposure time of the CCD image sensor to correspond with the preferred exposure time.

2. The method according to claim 1 wherein the exposure time of the CCD image sensor is extended with an increased shutter aperture angle.

3. The method according to claim 1 or claim 2 wherein at least one of the time and the duration of charging of the CCD image sensor is determined depending upon the shutter aperture angle for the purpose of changing the exposure time of the CCD image sensor.

4. The method according to claim 1, wherein a substratum voltage of the CCD image sensor is controlled so that the CCD image sensor is constantly discharged during shutting off of rays in the recording path for film exposure.

5. The method according to claim 1, wherein a substratum voltage of the CCD image sensor is controlled so that the CCD image sensor is discharged before it is charged depending upon the exposure time of the CCD image sensor as determined by a shutter logic.

6. The method according to claim 1, wherein a video timing frequency is connected to at least one of the shutter aperture angle recorded by a first sensor and the position of the adjustable rotary shutter recorded by a second sensor.

7. The method according to claim 1 wherein the exposure time of the CCD image sensor is adjusted to equal the film exposure time.

8. A device for controlling a video reflection device in a motion picture camera comprising:

an adjustable rotary shutter having a reflection surface (dark sector) and an opening sector (bright sector);

a microprocessor having an input side and an output side;

a video electronic mechanism arranged to emit a video timing signal that strikes the input side of the microprocessor;

a sensor recording at least one of an angle of the rotary shutter opening sector and a position of the adjustable rotary shutter, the sensor arranged to emit a signal to the input side of the microprocessor;

a timing generator having an input side and an output side and arranged to receive a signal on the input side from the output side of the microprocessor and also arranged to receive on the input side the video timing signal emitted by the video electronic mechanism;

a CCD image sensor arranged to receive a signal from the output side of the timing generator; and a shutter logic arranged to receive a signal from the output side of the timing generator;

wherein the shutter logic is arranged to emit a control signal with which the respective stored charge of the CCD image sensor is again discharged if the angle of the adjustable rotary shutter opening sector deviates from a prescribed value.

9. The device according to claim 8 wherein the shutter logic is arranged to emit the control signal to a component that is subsequently switched and that influences the substratum voltage of the CCD image sensor, whereby the component times the substratum voltage for the purpose of discharging the CCD image sensor.

* * * * *